US007187690B2

(12) United States Patent
Taylor

(10) Patent No.: US 7,187,690 B2
(45) Date of Patent: Mar. 6, 2007

(54) METHOD OF MAXIMIZING USE OF BANDWIDTH FOR COMMUNICATING WITH MOBILE PLATFORMS

(75) Inventor: Scott A. Taylor, Renton, WA (US)

(73) Assignee: The Boeing Company, Chicago, IL (US)

( * ) Notice: Subject to any disclaimer, the term of this patent is extended or adjusted under 35 U.S.C. 154(b) by 1033 days.

(21) Appl. No.: 10/151,530

(22) Filed: May 20, 2002

(65) Prior Publication Data
US 2003/0214966 A1 Nov. 20, 2003

(51) Int. Cl.
H04J 3/26 (2006.01)
(52) U.S. Cl. ............... 370/432; 455/430; 455/435
(58) Field of Classification Search ........... 455/435, 455/188.1, 430, 431; 370/316; 725/75
See application file for complete search history.

(56) References Cited

U.S. PATENT DOCUMENTS

| 5,557,656 | A | 9/1996 | Ray et al. |
|---|---|---|---|
| 5,956,644 | A | 9/1999 | Miller et al. |
| 6,018,659 | A | 1/2000 | Ayyagari et al. |
| 6,061,562 | A | 5/2000 | Martin et al. |
| 6,108,523 | A | 8/2000 | Wright et al. |
| 6,163,681 | A | 12/2000 | Wright et al. |
| 6,167,239 | A | 12/2000 | Wright et al. |
| 6,201,797 | B1 | 3/2001 | Leuca et al. |
| 6,253,067 | B1 | 6/2001 | Tsuji |
| 6,285,878 | B1 | 9/2001 | Lai |
| 6,392,692 | B1 | 5/2002 | Monroe |
| 6,449,287 | B1 | 9/2002 | Leuca et al. |
| 6,625,773 | B1* | 9/2003 | Boivie et al. ............... 714/749 |
| 6,741,841 | B1* | 5/2004 | Mitchell ............... 455/188.1 |
| 2002/0090946 | A1* | 7/2002 | Mielke et al. ............ 455/435 |
| 2002/0160773 | A1 | 10/2002 | Gresham et al. |
| 2002/0168971 | A1 | 11/2002 | Parkman |
| 2003/0043760 | A1* | 3/2003 | Taylor ..................... 370/316 |
| 2003/0093798 | A1* | 5/2003 | Rogerson .................. 725/75 |
| 2004/0142658 | A1* | 7/2004 | McKenna et al. ......... 455/11.1 |

* cited by examiner

Primary Examiner—Hassan Kizou
Assistant Examiner—Albert T. Chou
(74) Attorney, Agent, or Firm—Harness, Dickey & Pierce, P.L.C.

(57) ABSTRACT

A system and method for switching between transmission modes provides more efficient use of available bandwidth. A content delivery system determines, based upon a predetermined limit, whether to broadcast content to a plurality of mobile platforms or unicast the data content via a point-to-point communication link. Acknowledgment signals from the mobile platforms are used to determine if the predetermined limit has been exceeded. A specific number or percentage defines the predetermined limit within a specified time period. The number of acknowledgment signals received is compared to the limit to determine if an exceedance condition has occurred.

18 Claims, 3 Drawing Sheets

METHOD OF MAXIMIZING USE OF BANDWIDTH FOR COMMUNICATING WITH MOBILE PLATFORMS

FIELD OF THE INVENTION

The present invention relates generally to systems for controlling the transmission of data to a plurality of locations, and more particularly to a system for controlling content delivery to a plurality of mobile platforms to maximize bandwidth usage.

BACKGROUND OF THE INVENTION

Optimizing use of bandwidth through efficient control of data communication, and more particularly, maximizing use of allocated bandwidth for communicating data to a plurality of locations (i.e., points) is critical. In particular, when communicating data to mobile platforms using satellite communication, efficient bandwidth usage is especially critical. The more bandwidth that is required to transmit data because of inefficiencies, such as when broadcasting data to a plurality of locations when it is only needed in a few locations, the higher the cost of transmitting that data. Thus, determining the most efficient mode of transmission is crucial.

With the increased mobility in society today, resulting not only from the availability and lower cost of faster transportation (e.g., discount on-line airline tickets), but from the increased availability of devices for accessing information while in-transit (e.g., laptop computers and Personal Digital Assistants (PDAs)), increasing numbers of individuals are demanding more bandwidth at the same time. With the demand for bandwidth increasing rapidly, not only is controlling bandwidth allocation crucial, but determining the best mode of transmission is a must. Specifically, as electronic communication becomes more readily available on aircrafts, the efficient use of available bandwidth must be provided.

In particular, efficient data content delivery must be provided to maximize the use of available bandwidth. Various forms or modes of communication are known for communicating between electronic devices. For example, data may be transmitted in the following different modes: (1) broadcast to a transmission area or region; (2) multicast to a set of particular devices, such as point-to-multipoint communication; or (3) unicast to a specific device, such as point-to-point communication, among others. Depending upon the particular application, one of these communication modes may be more suited for use to meet specific efficiency needs.

Therefore, in order to maximize the use of available bandwidth, appropriate control of communication links, and more particularly, determining the most efficient communication method using a specific transmission mode is needed.

SUMMARY OF THE INVENTION

The present invention provides a system and method for maximizing the use of bandwidth when communicating with a plurality of mobile platforms (e.g., aircrafts). Depending upon the number of mobile platforms to which data is to be transmitted, the present invention determines the mode of communication to provide to thereby maximize bandwidth usage. The present invention provides a real-time system and method for compensating for specific mobile platform availability using feedback from the mobile platforms to thereby maximize bandwidth for communicating with the mobile platforms.

Generally, the present invention determines the mode of communication to provide in order to more efficiently use bandwidth, which may include, for example, statistically optimizing between different communication modes (i.e., broadcast mode and unicast mode). Essentially, based upon the number of mobile platforms that have received a broadcast signal containing specific data, the present invention provides for switching to unicast (i.e., point-to-point) communication mode from a broadcast mode to provide the specific information to the remaining mobile platforms (i.e., mobile platforms that have not already received the data). This results in more efficient communication and maximization of bandwidth usage resulting from the different advantages provided by each of the modes of communication. For example, point-to-point communication is more efficient for single deliveries of information (i.e., transmit data to a specific mobile platform), whereas broadcast communication is more efficient for distributing content to a larger number of mobile platforms. Therefore, it is critical to determine the proper mode for communication.

Specifically, the present invention provides a method that includes initially transmitting data content (e.g., media updates) to a plurality of mobile platforms needing the data by broadcasting the data. A determination is made after a predetermined time period as to the number of mobile platforms that have received the data. This determination also may be made after more than one predetermined time period. If a predetermined number of mobile platforms have received the data within the predetermined time period(s), the data is transmitted using unicast (i.e., point-to-point) communication to the remaining mobile platforms needing the data. A predefined formula may be provided to determine when to switch between the different modes of communication.

Broadcasting of data may continue to be provided by the present invention when broadcast bandwidth is underutilized. Further, unicast communication is preferably provided based upon the communication availability of specific mobile platforms. Confirmations in the form of acknowledgement signals also are preferably provided by the mobile platforms upon receiving the data. Mobile platform availability may be determined before unicasting the data.

The data being transmitted may include, for example, information to provide updates on-board the mobile platforms, and may be communicated to the mobile platforms via at least one satellite. Such data may be Web-based and provided as data packets for transmission. This data may be accessed on-board the mobile platforms via portable electronic devices using interfaces on-board the mobile platforms.

A system of the present invention includes communication means, such as a ground based transmitter for transmitting data, receiving means on-board each of the mobile platforms for receiving the data and a content delivery system for switching between a broadcast communication mode and a unicast communication mode based upon bandwidth and communication requirements, including the number of mobile platforms that have received the data within a predetermined period of time. At least one satellite may be used in combination with the system to communicate with the mobile platforms (e.g., aircrafts). Further, components on-board the mobile platforms may be provided to communicate data within the mobile platforms.

Thus, the present invention provides a system and method for efficiently communicating with a plurality of mobile platforms and maximizing the use of available bandwidth by switching between transmission or communication modes.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to use of specific communication components providing communication with particular mobile platforms, it is not so limited, and the present invention may be used in connection with any system requiring efficient communication to different locations or devices.

Figure 1:
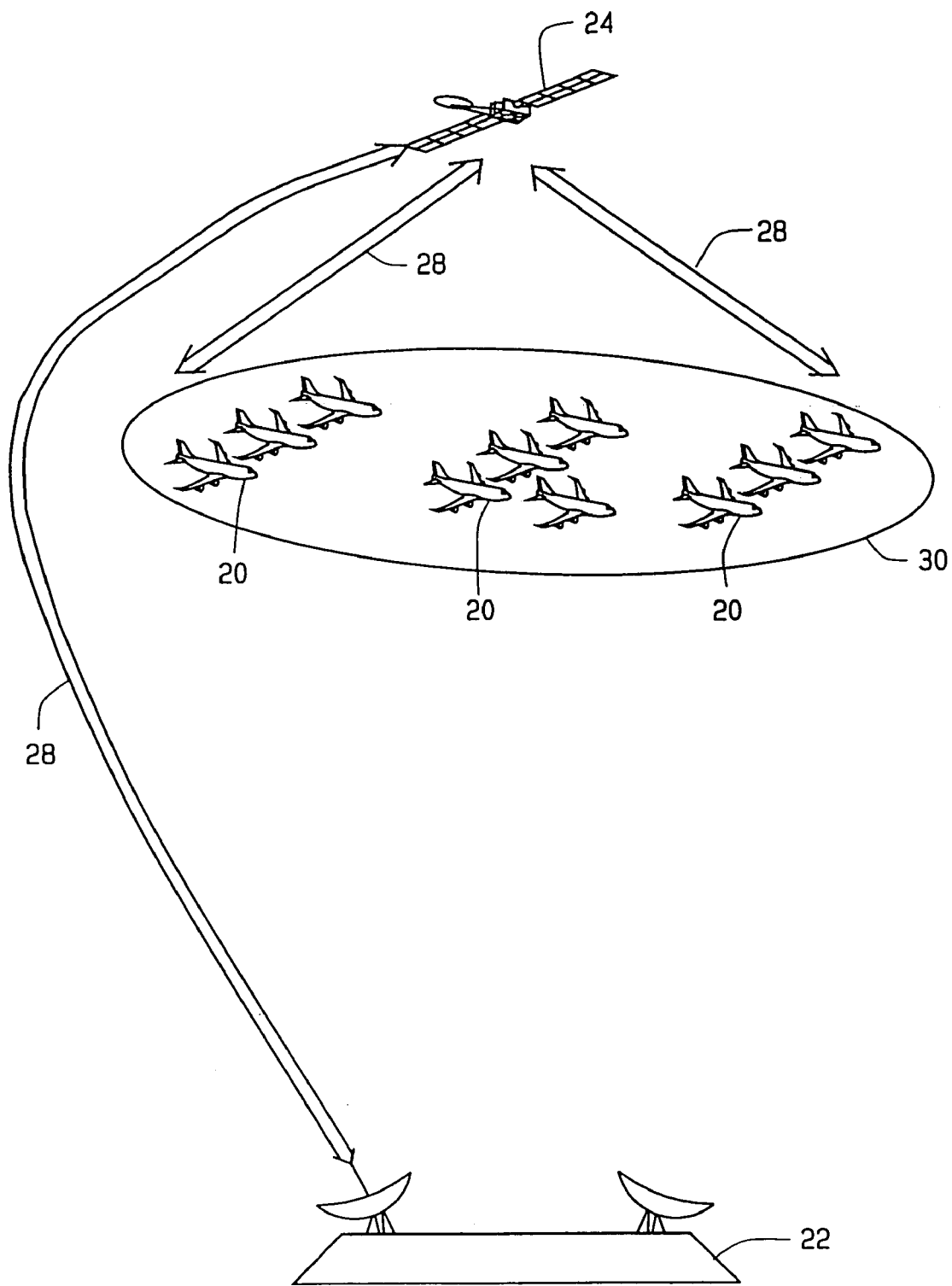
FIG. 1 is a perspective view of an exemplary communication system in which the present invention may be implemented.

Referring to FIG. 1, and a system in which the present invention may be implemented, a plurality of mobile platforms 20, illustrated as aircrafts, are provided in bidirectional communication with a ground system 22 using a satellite system comprising at least one satellite 24. Bi-directional communication of data, typically configured as data packets, between the ground system 22 and the plurality of mobile platforms 20 via the at least one satellite 24 is provided along data paths 28 in any known manner and according to the particular communication system requirements. The satellite 24 may broadcast signals having data packets to a transmission region 30, with mobile platforms 20 within the transmission region 30 that are adapted to receive the broadcast signal obtaining the transmitted data packets depending upon receiver availability. The satellite 24 may also unicast data to a particular mobile platform 20 via a point-to-point communication. One such system for communicating between a ground system and mobile platforms via satellites is described in co-pending application Ser. No. 09/636,912 entitled "Method and Apparatus For Providing Bi-Directional Data Services and Live Television Programming to Mobile Platforms," filed on Aug. 16, 2000, which is assigned to the assignee of (the present invention and is hereby incorporated in its entirety herein by reference.

Generally, the present invention provides for maximizing the use of bandwidth when transmitting data from the ground system 22 to the mobile platforms 20 using the data paths 28. The present invention provides for controlling the type or mode of transmission from the ground system 22 to the plurality of mobile platforms 20. This preferably includes switching between a broadcast transmission mode (i.e., broadcast a signal to the transmission region 30) and a unicast transmission mode (i.e., point-to-point) that transmits data to a specific mobile platform 20 as described herein. It should be appreciated that other modes of transmission may be provided as needed or required. This may include, for example, broadcasting data to a limited number of specific mobile platforms 20. Further, the present invention may be used in connection with systems that determine the most efficient method for delivering data, information, etc. to a mobile platform in a manner which maximizes the utilization of the allocated spectrum of each satellite transponder of the system. Such a system is described in co-pending application Ser. No. 09/947,972 entitled "Content Delivery Optimizer For A Communication System," filed on Sep. 6, 2001 which is assigned to the assignee of the present invention and is hereby incorporated in its entirety herein by reference.

Each mobile platform 20 is preferably provided with a communication system that may include a transmitter/receiver, on-board routers, on-board servers and an antenna. The ground system 22 may include a transmitter/receiver, routers and servers. These and other component parts may be provided in any known manner and as required by the particular communication system.

Figure 2:
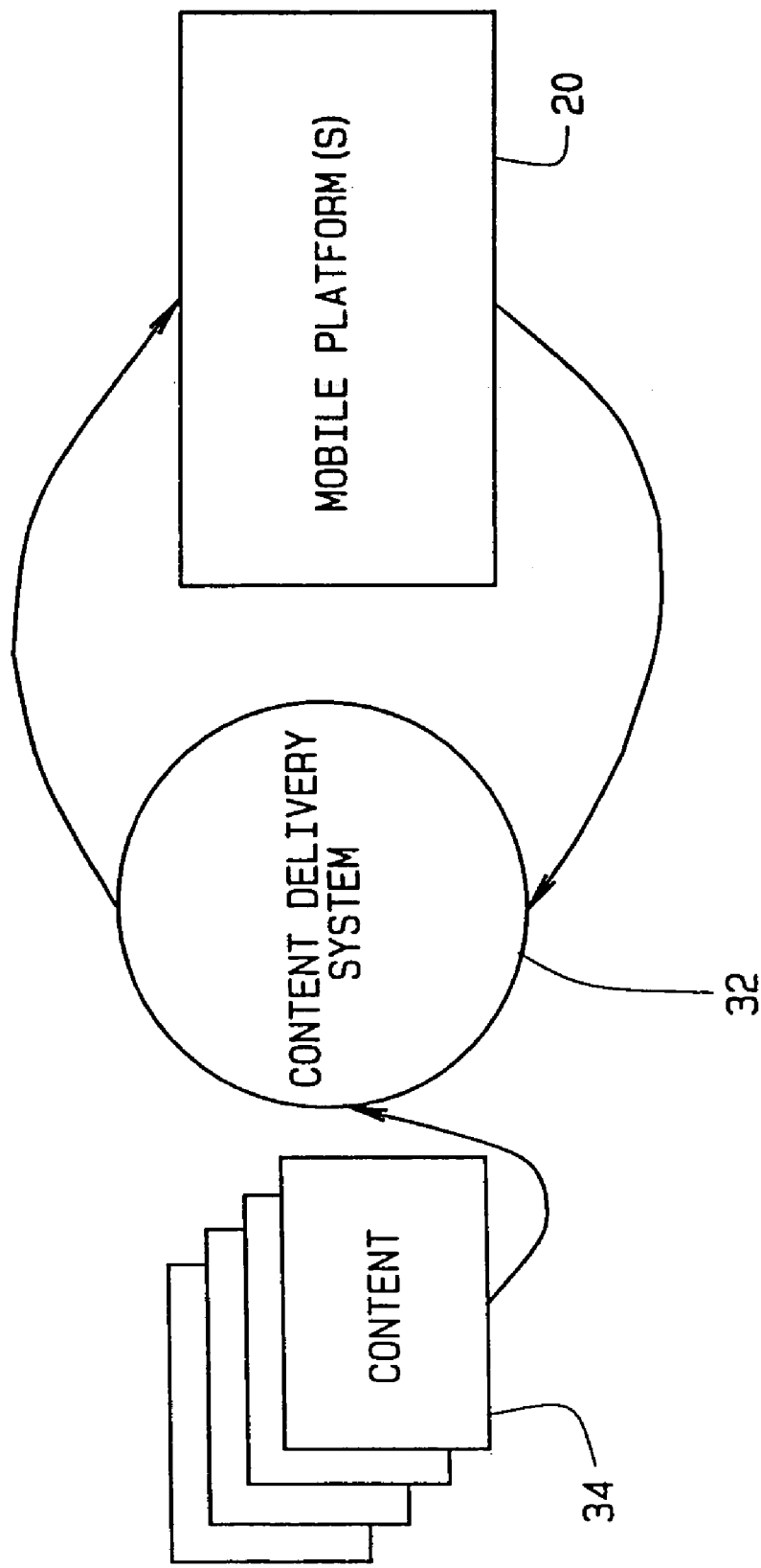
FIG. 2 is a simplified block diagram of a system for maximizing bandwidth usage constructed according to the principles of the present invention.

In a more preferred embodiment of the present invention, the ground system 22 includes a content delivery system 32 as shown in FIG. 2 that determines the mode of transmission for the ground system 22. The content delivery system 32 receives data/content 34 and provides content delivery functionality as described in more detail herein. Essentially, the content 34 is transmitted to the mobile platforms 20 from the ground system 22 using a transmission mode determined by the content delivery system 32, which transmission mode is based upon feedback (i.e., acknowledgement signals) from the plurality of mobile platforms 20. It should be noted that in an aircraft environment, each of the plurality of mobile platforms 20 is preferably assigned an aircraft identification number for use in identifying the specific aircraft.

The content delivery system 32 is provided with content 34 to be transmitted to the plurality of mobile platforms 20. In an aircraft environment, this content 34 may include update information, such as Web-based content providing destination information (e.g., current weather, news, etc.) for a particular area, or entertainment content (e.g., movies, music, etc.) for viewing by passengers. This content may be provided on-board the aircraft, for example, by accessing servers via portable electronic devices (e.g., laptop computers, PDAs, etc.) that are connected to interfaces on-board the aircrafts. However, the content 34 is not limited to passenger information, but may include system information, such as identifying the particular frequency band for communication in a transmission region 30, or providing address assignment information to the mobile platforms 20.

Further, within any transmission region 30, a plurality of mobile platforms 20 may require this content 34. Therefore, in operation, it is preferable to initially broadcast the content 34 to the mobile platforms 20 within the transmission region 30. Thereafter, once at least some of the plurality of mobile platforms 20 have received the content 34, transmission using a direct single communication link (i.e., unicast communication) is provided. Signals containing the content 34 are transmitted to the plurality of mobile platforms 20 at specified time intervals (e.g., every 30 seconds). It should be noted that if the identity of the specific mobile platforms 20 in a given transmission region 30 are known, such that the destination address, (e.g., IP address) for each mobile platform 20 is known, the content 34 alternately may be multicast to the plurality of known mobile platforms 20.

Figure 3:
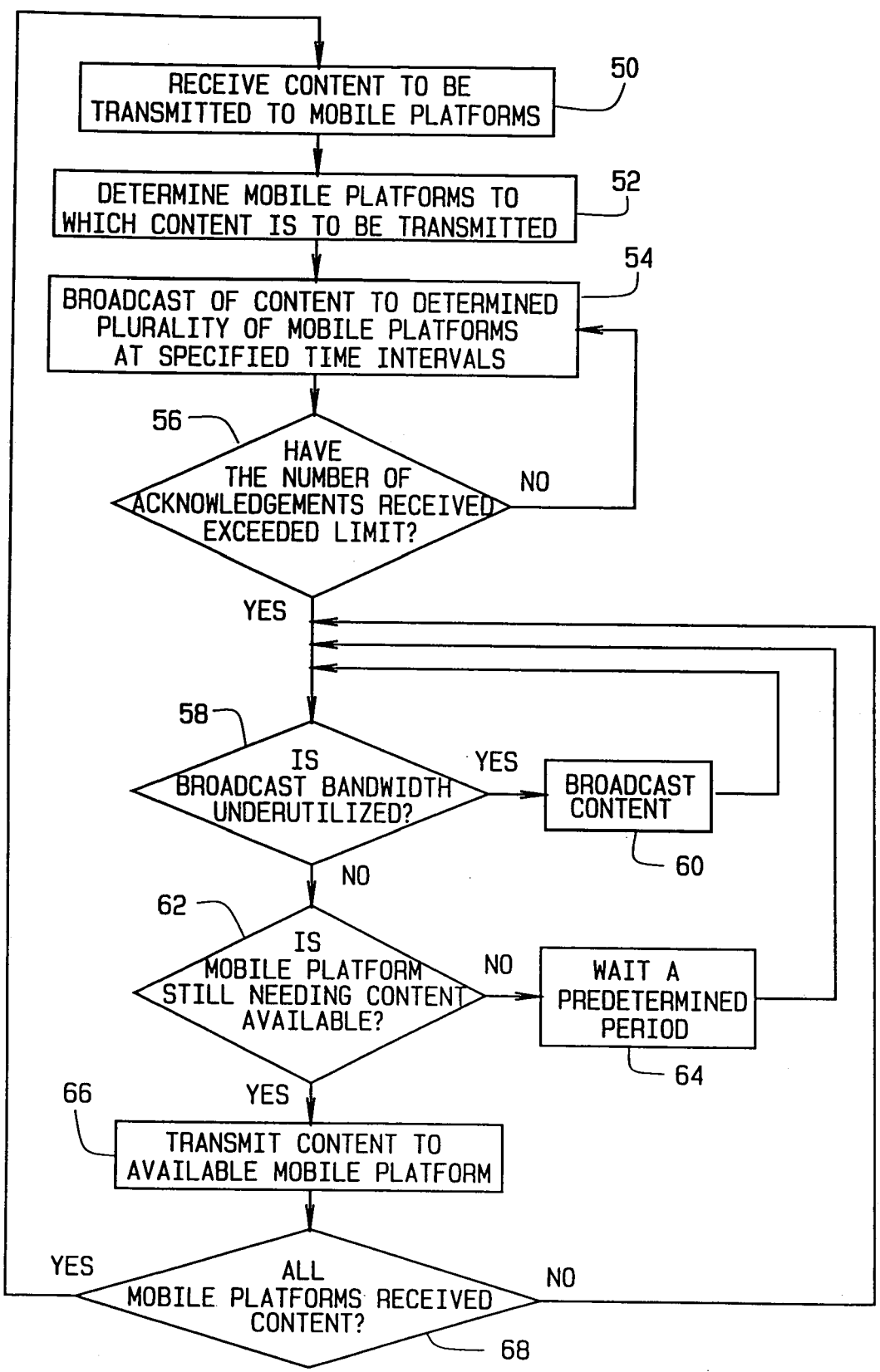
FIG. 3 is flow chart showing a bandwidth maximization process using different modes of communication according to the present invention.

A particularly preferred method of the present invention for implementing the content delivery system 32 is shown in flow chart form in FIG. 3. As shown therein, content 34 to be transmitted to the plurality of mobile platforms 20 is received at step 50 by the content delivery system 32. Included in this content 34 is destination information, such as an identification of the mobile platforms 20 or the transmission region 30 to which the content 34 is to be transmitted. Based upon the destination information, at step 52 the mobile platforms 20 or transmission region 30 to which the data content 34 is to be transmitted is determined and appropriate transmission communication settings are provided (e.g., frequency band).

Once the mobile platforms 20 or transmission region 30 to which the data content 34 is to be transmitted is determined, at step 54 the data content 34 is broadcast to the mobile platforms 20 or transmission region 30. It should be noted that the content delivery system 32 may include a separate means (e.g., a transmission system) for broadcasting the content 34 or may be incorporated into another system, such as the ground system 22. Also, the plurality of mobile platforms 20 may be located in one or more transmission regions 30.

The content 34 is preferably broadcast at predetermined time intervals (e.g., every 30 seconds) to the plurality of mobile platforms 20 or to the transmission region 30. Upon receiving the broadcast content 34, a mobile platform 20 transmits an acknowledgement signal indicating that the content 34 has been received. The acknowledgment signal may be provided in any known manner and includes information identifying the specific mobile platform 20.

After a predetermined number of time intervals, at step 56 the number of acknowledgment signals received from the mobile platforms 20 is compared to the total number of mobile platforms 20 to which the content 34 is being broadcast to determine if a limit has been exceeded. For example, the content delivery system 32 may determine if a pre-defined number of mobile platforms 20 representing a percentage limit (e.g., 75 percent) have received the content 34. If the number of acknowledgement signals has not exceeded the limit, the content 34 is again broadcast at step 54. If the limit is exceeded at step 56, a determination is made at step 58 as to whether broadcast bandwidth is currently underutilized. If broadcast bandwidth is underutilized, the content 34 is broadcast at step 60 a single time, and then the broadcast bandwidth usage is again determined at step 58.

If the broadcast bandwidth is not underutilized, at step 62 the mobile platforms 20 still needing the content 34 are polled to determine their transmission availability. If none of the mobile platforms 20 still needing the content 34 are available, the content delivery system 32 waits a predetermined period at step 64, and then a determination is again made as to whether broadcast bandwidth is underutilized at step 58, with the subsequent steps performed as described herein. If at least one of the mobile platforms 20 still needing the content 34 is available at step 62, then at step 66, the content 34 is unicast (i.e., transmit via a point-to-point transmission) to the at least one mobile platform 20.

Thereafter, at step 68, if all of the mobile platforms 20 have received the content 34, the content delivery system 32 again receives content 34 to be transmitted at step 50. It should be noted that the content delivery system 32 may receive different content 34 (e.g., different data updates) to be transmitted to different groups of mobile platforms 20 or transmission regions 30 and provide the process illustrated in FIG. 3 simultaneously for each of the different content 34.

If not all of the mobile platforms 20 have received the content 34 at step 68, a determination is again made as to whether the broadcast bandwidth is underutilized at step 58, with the subsequent steps performed as described herein.

In operation, and for example, content 34 may be broadcast twenty times in two hours (i.e., predetermined number of time intervals) to twelve mobile platforms 20, with acknowledgments received from ten of the twelve mobile platforms 20 to which the data content 34 is being transmitted. If the predetermined limit is 75 percent, then the content 34 will be transmitted via a point-to-point communication to the remaining two mobile platforms 20 as described herein unless broadcast bandwidth is currently underutilized, as the predetermined limit (i.e., 75 percent) has been exceeded.

Thus, the present invention provides a system and method for efficiently using bandwidth for communicating with mobile platforms by switching between a broadcast communication mode and a unicast communication mode based upon predetermined limits, and using feedback from the mobile platforms. Compensation for inconsistencies in mobile platform 20 availability is provided by the feedback, which is used to maximize bandwidth.

Although the present invention has been described in connection with a system communicating with specific mobile platforms based upon certain predetermined criteria, it is not so limited, and the present invention may be implemented in connection with other systems communicating with different mobile platforms using different criteria as required by the system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of maximizing bandwidth use in communications between a base station and a plurality of mobile platforms, the method comprising:

using a broadcast transmission scheme to transmit data periodically to the plurality of mobile platforms;

determining the number of mobile platforms that have received the broadcast data in a predetermined time period and if available broadcast bandwidth is not being underutilized, then using a unicast transmission scheme to transmit the data to each of the mobile platforms that have not received the data after a predetermined number of the mobile platforms have been determined to have received the data in the predetermined time period; and if broadcast bandwidth is being underutilized, then using said broadcast transmission scheme rather than said unicast transmission scheme to subsequently transmit said data.

2. The method according to claim 1 wherein the step of determining comprises receiving acknowledgment signals from the mobile platforms that have received the data.

3. The method according to claim 1 wherein the data is provided to systems on-board the mobile platforms and further comprising accessing the data from on-board the mobile platforms using a portable electronic device.

4. The method according to claim 1 wherein the mobile platforms are aircrafts and the steps of using a broadcast transmission scheme and a unicast transmission scheme are provided via at least one satellite.

5. The method according to claim 1 further comprising using a predefined formula to determine when to perform the step of using a unicast transmission scheme.

6. The method according to claim 1 wherein the step of using a unicast transmission scheme is provided via a point-to-point connection and further comprising waiting for mobile platform availability before using the point-to-point connection.

7. A method of transmitting data to a plurality of mobile platforms to maximize the use of available bandwidth using a communication system having a base station and at least one satellite for transmitting the data to plurality of mobile platforms, the method comprising the steps of:
broadcasting data to a plurality of mobile platforms;
receiving confirmation from the mobile platforms that have received the data;
determining the number of mobile platforms that have received the data in a predetermined time period based upon the confirmations;
transmitting the data using a point-to-point connection to the mobile platforms not providing confirmation after a predetermined number of mobile platforms have been determined to have received the data in the predetermined time period; and switching between broadcast and point-to-point transmission schemes based upon the availability of broadcast bandwidth.

8. The method according to claim 7 wherein the confirmation comprises an acknowledgement signal identifying the specific mobile platforms that have received the data.

9. The method according to claim 7 wherein the data is real-time content for use on-board the mobile platforms and further comprising updating systems on-board the mobile platform based upon the real-time content.

10. The method according to claim 7 further comprising using a predefined formula to determine when to start performing the step of transmitting.

11. The method according to claim 7 wherein the mobile platforms are aircrafts and further comprising using at least one satellite to provide the steps of broadcasting and transmitting the data.

12. The method according to claim 7 wherein the step of broadcasting data is performed periodically.

13. The method according to claim 7 wherein the step of transmitting further comprises determining the availability of the mobile platforms to receive the data.

14. A system for maximizing bandwidth use when communicating with a plurality of mobile platforms, the system comprising:
communication means for communicating data to the plurality of mobile platforms;
receiving means on-board each of the mobile platforms for receiving the communicated data; and
a content delivery system for switching between a broadcast transmission mode and a unicast transmission mode based upon the number of mobile platforms that have received the data within a predetermined period of time, and based upon whether an available broadcast bandwidth is being underutilized.

15. The system according to claim 14 wherein the mobile platforms comprise aircrafts and further comprising at least one satellite for providing communication with the plurality of aircrafts.

16. The system according to claim 14 wherein the communication means comprises a ground-based transmitter.

17. The system according to claim 14 wherein the plurality of mobile platforms comprise aircrafts and further comprising components on-board the aircrafts for communicating the data within the aircrafts.

18. The system according to claim 17 wherein the data is Web-based and the aircrafts comprise a plurality of interfaces allowing users to access the Web-based data.

\* \* \* \* \*

UNITED STATES PATENT AND TRADEMARK OFFICE
CERTIFICATE OF CORRECTION

PATENT NO. : 7,187,690 B2  Page 1 of 1
APPLICATION NO. : 10/151530
DATED : March 6, 2007
INVENTOR(S) : Scott A. Taylor It is certified that error appears in the above-identified patent and that said Letters Patent is hereby corrected as shown below:

Title Page

Item (75) Inventor: "Scott A. Taylor" should read --Scott P. Taylor--

Signed and Sealed this

First Day of May, 2007

JON W. DUDAS
*Director of the United States Patent and Trademark Office*